Oct. 18, 1955    U. BAUMANN ET AL    2,721,278
DYNAMOELECTRIC ROTOR, PARTICULARLY
FOR SMALL INDUCTION MOTORS
Filed Aug. 13, 1952
*Fig. 1*
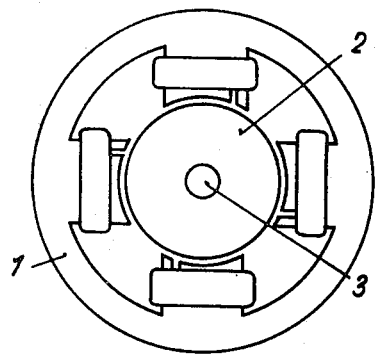
*Fig. 2*    *Fig. 3*
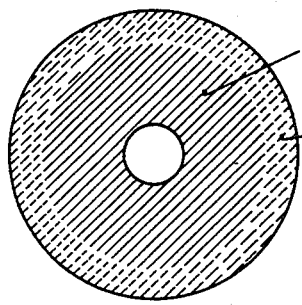 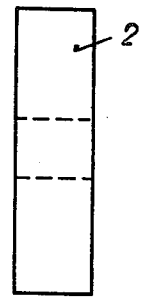
*Fig. 4*
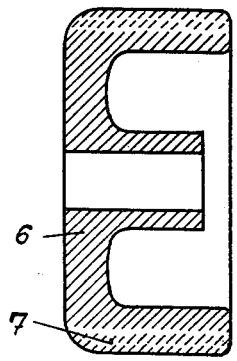
Inventors
Ulrich Baumann
Willy Mehlitz
By C. M. Avery
Attorney

United States Patent Office 2,721,278
Patented Oct. 18, 1955

2,721,278

DYNAMOELECTRIC ROTOR, PARTICULARLY FOR SMALL INDUCTION MOTORS

Ulrich Baumann, Berlin-Wilmersdorf, and Willy Mehlitz, Berlin-Nikolassee, Germany, assignors to Siemens-Schuckertwerke Aktiengesellschaft, Erlangen, Germany, a corporation of Germany Application August 13, 1952, Serial No. 304,142

Claims priority, application Germany August 15, 1951

5 Claims. (Cl. 310—44)

Our invention relates to dynamoelectric rotors and their manufacture, and in a more particular aspect to rotors for small electric motors such as fractional horsepower motors for alternating current.

It is an object of our invention to devise a dynamoelectric rotor of an extremely simple design that may be accurately manufactured by a large-scale production method of improved simplicity and is especially well-suitable for various types of small alternating-current motors such as induction motors with a short-circuited rotor winding or synchronous motors without rotor windings.

It has been proposed to produce the iron bodies of electric machines by powder-metallurgical methods from iron powder. To achieve the objects of our invention we apply a similar production method but compose the dynamoelectric rotor of a sintered agglomerate of two mixed components of different magnetic properties, namely particles of a ferromagnetic metal such as iron, and particles of a non-magnetic metal such as copper. According to another feature of our invention, the mixture of comminuted metals has different proportions in respectively different zones of the sintered rotor body as will be apparent from the embodiments exemplified by the drawing in which Fig. 1 shows schematically a small induction motor with a rotor according to the invention, Fig. 2 shows schematically a cross section and Fig. 3 a side view of the same rotor, while Fig. 4 shows a cross section of another rotor according to the invention.

The motor illustrated in Figs. 1 to 3 has a stator 1 with four field poles and pertaining pole windings. The poles may be slitted to receive a shading winding. The pertaining rotor 2, mounted on shaft 3, is disc shaped and consists throughout of a sintered agglomerate of powdered iron with a powdered non-magnetic metallic material. The non-magnetic material is preferably copper but may also consist of aluminum or similar metals or alloys or mixtures of such metals. In the inner zone 4 of the rotor body, the metal mixture contains a smaller proportion of non-magnetic metal than in the outer zone 2, this difference being schematically indicated in Fig. 2 by full-line and broken-line cross-hatching. The two zones may have any desired radial extent relative to each other, and it will be understood that the zones may merge with each other in a gradual transition so that the mixture proportion varies more or less continuously from within toward the periphery of the rotor.

The rotor may be given any desired shape depending upon the design and particular type of the motor. For instance, the rotor may have a smaller proportionate axial width than shown in Fig. 2, or it may form an axially more elongated cylinder. Fig. 4, for instance, shows a bell-shaped rotor designed as explained above, the two zones of different mixture proportions being denoted by 6 and 7.

For producing such rotors, a previously prepared mixture of the ferromagnetic and non-magnetic metal powders is fed into a rotor-shaped mold and is then compacted by jogging, compressing or a similar operation to assume substantially its final shape. Thereafter the molded body is heated to a sintering temperature, below the melting point of the higher melting component or below the melting points of both components, until the body is consolidated.

Another method of producing rotors according to the invention is to prepare first an only slightly compacted and hence highly porous skeleton structure from ferromagnetic metal powder with the aid of a mold shaped substantially in accordance with the final shape and dimensions of the rotor. Thereafter the structure is subjected to sintering and subsequently impregnated with the non-magnetic metal, for instance, by placing the molten non-magnetic metal onto the porous body or by immersing the porous body into a melt of the non-magnetic metal, these impregnating methods being known as such for other powder-metallurgical purposes.

The manufacturing process may be carried out in such a manner that the mixture proportion of the magnetic and non-magnetic metal components is uniform throughout the entire volume of the rotor. It is also possible to make the mixture proportion different in different zones of the rotor body. Preferably, the proportion of non-magnetic metal is kept higher in the vicinity of the outer periphery of the rotor, as is the case in the above-described and illustrated embodiments. In this manner, a more or less coherent phase or structure of non-magnetic metal is distributed through the ferromagnetic texture thus forming a kind of short-circuited winding to act in the sense of a starting winding, for instance, in small synchronous motors.

The mixture proportion may be chosen within wide limits depending upon the particular requirements and the properties of the metals. Generally the proportion of magnetic to non-magnetic metals is within 40:60 and 90:10. For rotors, an iron-copper proportion of about 60 to 40 is especially well suitable. When the mixture proportions are different in the different zones of the rotor, the inner portion may consist of up to 100% magnetic powder while the outer portion consists preferably of about 80 parts of non-magnetic powder and about 20 parts of magnetic powder.

It will be obvious to those skilled in the art that our invention is not limited to the particular motor and rotor shapes illustrated on the drawing but may be used to advantage with rotors of different design and for different types of dynamoelectric machines, without departing from the essence of the invention and within the scope of the claims annexed hereto.

We claim:

1. A dynamoelectric rotor consisting of a sintered agglomerate of powder particles, said agglomerate being a mixture of ferromagnetic metal and electrically conductive non-magnetic metal.

2. A rotor consisting of a body containing a mixture of magnetic and electrically conductive non-magnetic metals, said body having an outer and an inner annular zone, said outer zone containing a larger proportion of non-magnetic metal in its mixture than said inner zone.

3. A rotor for an induction motor, consisting essentially of a sintered agglomerate of a mixture of ferro-magnetic metal particles and electrically conductive non-magnetic metal particles, said mixture having different mixture proportions in respective different annular zones of different radii of the rotor.

4. A dynamoelectric rotor for an induction motor, consisting essentially of a sintered agglomerate body of a mixture of comminuted magnetic metal and comminuted electrically conductive non-magnetic metal, said body having an annular zone coaxial with the axis of rotation of said rotor in which said mixture has a larger proportion of non-magnetic metal than in the rest of the body.

5. The method of producing a dynamoelectric rotor, which comprises molding and sintering a quantity of powdered ferromagnetic metal into a porous skeleton structure of rotor shape and then impregnating different annular zones of said structure with respectively different amounts of electrically conductive non-magnetic metal in the molten state, whereby different proportions of non-magnetic to magnetic metals result in said different respective zones.

References Cited in the file of this patent

UNITED STATES PATENTS

| | | |
|---|---|---|
| 2,110,967 | Andrews | Mar. 15, 1938 |
| 2,125,970 | Waters | Aug. 9, 1938 |
| 2,128,544 | Surjaninoff | Aug. 30, 1938 |
| 2,193,435 | Smith | Mar. 12, 1940 |
| 2,221,983 | Mayer et al. | Nov. 19, 1940 |
| 2,363,337 | Kelly | Nov. 21, 1944 |
| 2,386,604 | Goetzel | Oct. 9, 1945 |
| 2,387,073 | Horlacher | Oct. 16, 1945 |
| 2,394,501 | Weiller | Feb. 5, 1946 |
| 2,450,982 | O'Brien | Oct. 12, 1948 |

FOREIGN PATENTS

| | | |
|---|---|---|
| 266,799 | Great Britain | Feb. 28, 1927 |